(12) United States Patent
Toba et al.

(10) Patent No.: US 8,955,023 B2
(45) Date of Patent: Feb. 10, 2015

(54) TRANSFER DEVICE, TRANSFER METHOD, AND PROGRAM

(75) Inventors: Kazuaki Toba, Kanagawa (JP); Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1291 days.

(21) Appl. No.: 12/566,014

(22) Filed: Sep. 24, 2009

(65) Prior Publication Data

US 2010/0083327 A1    Apr. 1, 2010

(30) Foreign Application Priority Data

Sep. 30, 2008    (JP) ................................ 2008-255452

(51) Int. Cl.
| | |
|---|---|
| H04N 7/173 | (2011.01) |
| H04L 29/12 | (2006.01) |
| H04N 21/41 | (2011.01) |
| H04N 21/436 | (2011.01) |
| H04N 21/643 | (2011.01) |

(52) U.S. Cl.
CPC .......... *H04L 61/106* (2013.01); *H04N 21/4122* (2013.01); *H04N 21/43615* (2013.01); *H04N 21/64322* (2013.01)
USPC ...................................................... 725/109

(58) Field of Classification Search
CPC .......... H04N 21/4622; H04N 7/17318; H04N 21/4782; H04N 21/8586; H04N 21/4788
USPC ..................... 725/78–80; 710/5–16
See application file for complete search history.

(56) References Cited

U.S. PATENT DOCUMENTS

| | | | | |
|---|---|---|---|---|
| 6,963,925 | B1 * | 11/2005 | Ishikawa et al. ............... | 709/238 |
| 2011/0004704 | A1 * | 1/2011 | Herlein et al. .................... | 710/5 |

FOREIGN PATENT DOCUMENTS

| | | |
|---|---|---|
| EP | 1 063 829 A | 12/2000 |
| JP | 2001-007861 A | 1/2001 |
| JP | 2002-232377 A | 8/2002 |
| JP | 2006-094509 A | 4/2006 |
| JP | 2007-143059 A | 6/2007 |
| JP | 2007-311884 A | 11/2007 |
| JP | 2008-034907 A | 2/2008 |
| WO | WO 2008-056707 A1 | 5/2008 |
| WO | WO 2008-056709 A1 | 5/2008 |

OTHER PUBLICATIONS

"High-Definition Multimedia Interface. Specification Version 1.3a"; Internet citation, retrieved on Mar. 27, 2008; http://www.hdmi.org/download/HDMISpecification13a.pdf.

* cited by examiner

*Primary Examiner* — Benjamin R Bruckart
*Assistant Examiner* — Anthony Bantamoi
(74) *Attorney, Agent, or Firm* — Wolf, Greenfield & Sacks, P.C.

(57) ABSTRACT

A transfer device includes: a first network connection control section that controls connection to a first network enabling transfer of content data and/or control data using a first address assigned by a key device in the network; a second network connection control section that controls connection to a second network enabling transfer of content data and/or control data using a second address assigned by a device having a routing function; and an address table that stores the correspondence between the first address of devices on the first network connected via the first network connection control section and the second address of the devices on the second network connected via the second network connection control section.

9 Claims, 10 Drawing Sheets

| HDMI ADDRESS | IP ADDRESS | DEVICE TYPE | DLNA | INTERNET CONNECTION |
|---|---|---|---|---|
| 0.0.0.0 | 192.XX.XXX.XXA | DISPLAY DEVICE | CLIENT | YES |
| 1.1.0.0 | 192.XX.XXX.XXB | RECORDER/ PLAYER | SERVER | NO |
| 1.0.0.0 | 192.XX.XXX.XXC | AUDIO | NOT SUPPORTING | NO |
| 1.1.1.0 | 192.XX.XXX.XXD | PLAYER | SERVER | NO |
| | | | | |

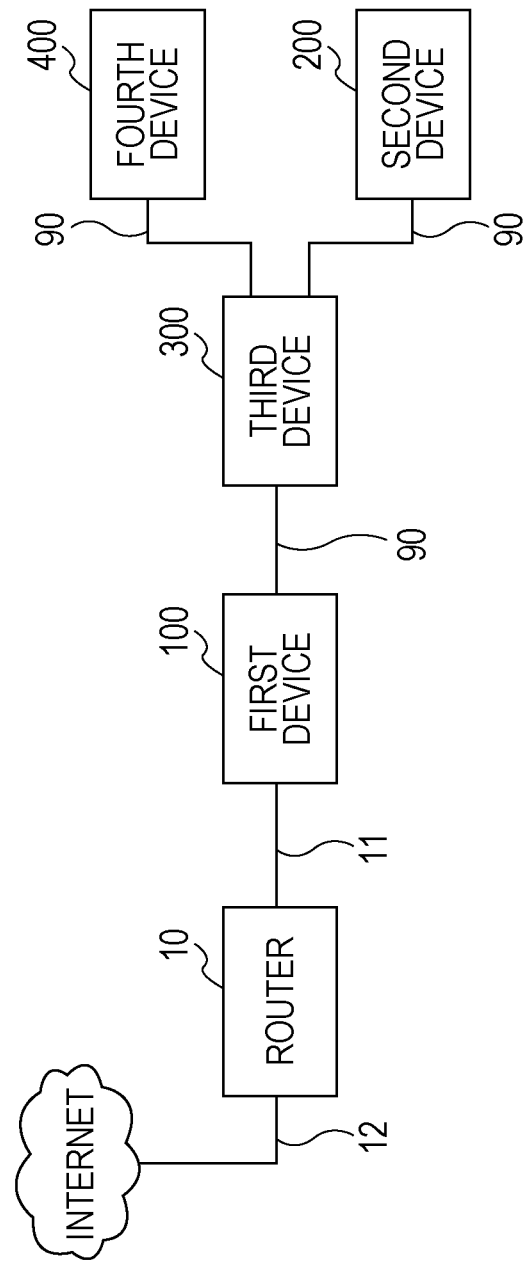

FIG. 5

| HDMI ADDRESS | IP ADDRESS | DEVICE TYPE | DLNA | INTERNET CONNECTION |
|---|---|---|---|---|
| 0.0.0.0 | 192.XX.XXX.XXA | DISPLAY DEVICE | CLIENT | YES |
| 1.1.0.0 | 192.XX.XXX.XXB | RECORDER/ PLAYER | SERVER | NO |
| 1.0.0.0 | 192.XX.XXX.XXC | AUDIO | NOT SUPPORTING | NO |
| 1.1.1.0 | 192.XX.XXX.XXD | PLAYER | SERVER | NO |
|  |  |  |  |  |

TRANSFER DEVICE, TRANSFER METHOD, AND PROGRAM

BACKGROUND OF THE INVENTION

1. Field of the Invention

The present invention relates to a transfer method suitably applicable to a system including a device that performs input or output in accordance with a digital video/sound input/output interface standard called a "High-Definition Multimedia Interface (HDMI) standard", a transfer device applicable to the transfer method, and a program implemented in the transfer device.

2. Description of the Related Art

An "HDMI standard" has been proposed as an interface standard for a network allowing transfer of uncompressed digital video data, for example, between a plurality of video devices. In accordance with the HDMI standard, video data is transferred individually pixel by pixel as primary color data. Sound data (audio data) is transferred using a transfer line for video data during a blanking period of the video data. The primary color data to be transferred includes primary color data for red, green, and blue (R data, G data, and B data). Luminance and color-difference signals such as Y, Cb, and Cr may be transferred instead of the primary color data.

A network formed by connection through a transfer line according to the HDMI standard may include, for example, devices mainly for transmitting or receiving video or sound such as a television receiver, a video recording/playback device, a video playback device, and a computer device. The connection through a transfer line according to the HDMI standard enables transfer of video contents and sound contents. Besides the line and period for transferring video content data and sound content data, a line and period for transferring control data for controlling a recipient device may also be provided. In the description below, a network formed by connection through a transfer line according to the HDMI standard is referred to as an "HDMI network".

Meanwhile, a network called a "Local Area Network (LAN)" is widely used as a wired or wireless network. In case the of a wired LAN, for example, devices are connected using a LAN cable such as a twisted pair cable, and a router provided on the network assigns an IP address to respective devices in the network to allow communication. In case the of a wireless LAN, communication between the devices and the router is performed wirelessly. In the description below, a network in which transfer is performed using an IP address is referred to as an "IP network".

In the case where a device connected to a LAN (an IP network) is also connected to the Internet as an external network, a router having a relay function (routing function) assigns an IP address according to rules of the Internet (such as a global IP address) to the device so that the device may communicate with various servers on the Internet. In the case where a device connected to a LAN is not connected to the Internet, on the other hand, the router assigns an IP address, which is private to the LAN, (such as a private IP address) to the device.

In recent years, various video devices connectable to a LAN such as television receivers have been commercialized along with the widespread proliferation of Internet connection through fiber optics. The connectability to the Internet by way of a LAN makes it possible to acquire via the Internet, display, and accumulate video contents and sound contents accumulated in an external server. Besides acquiring contents such as video contents, the connectability to the Internet also makes it possible to acquire data on a program table, update software for a device connected to the network, and so forth. The connectability to the Internet further makes it possible to make a reservation to record a program on a device having a recording/playback function from an external device connected to the Internet.

In case the of a video device connectable to a LAN, the video device itself may include a built-in router (routing function section) for assigning an IP address.

Japanese Unexamined Patent Application Publication No. 2002-232377 discloses the details of data transfer according to the HDMI standard.

Japanese Unexamined Patent Application Publication No. 2007-143059 discloses transmission and reception of video using an IP address.

SUMMARY OF THE INVENTION

Because an IP address is determined and assigned by the router provided on the network, however, an IP address assigned to a device in the network may be subjected to a change any time along with turning on and off of the device.

When a device connected to an IP network is to send data on the IP network, it is necessary for the device to designate a destination using an IP address. Thus, when a user designates a destination, it is necessary for the user to select a recipient while viewing display of IP addresses, for example. Because displaying an IP address alone is inconvenient, the related art proposes acquiring information on the type of a destination device on an IP network to display the acquired information. In either case, however, it is inconvenient that the user select a device only in reliance on IP addresses.

In the case where a video device transfers data via an IP network, in addition, power supply to the video device in the IP network may be controversial. That is, in an IP network in which IP addresses are used, it is basically necessary to have all the devices in the network turned on, and to have at least a communication function section for communication over the IP network turned on at all times. Thus, it is in general necessary for a video device with a terminal for IP network connection to have at least its communication function section for the IP network turned on at all times, which makes it difficult to completely turn off the video device. Therefore, the video device with an IP network terminal may consume a great amount of electricity in a waiting state (standby state).

In view of the foregoing, it is desirable to facilitate selection of a device and reduce electricity consumption in a transfer process using a network address such as an IP address.

The present invention is applicable to a transfer device connectable to a first network and a second network. The first network enables transfer of content data and/or control data using a first address assigned by a key device in the network. The second network enables transfer of content data and/or control data using a second address assigned by a device having a routing function.

The transfer device connectable to the first network and the second network includes an address table that stores the correspondence between the first address and the second address of devices connected to both the first network and the second network.

With this configuration, the correspondence between addresses acquired for the first network and addresses acquired for the second network is known from the address table at all times. Therefore, it is possible for the transfer device to identify each device on the network using the first address, even in the case where the second address for use in the second network is changed, by referencing the address table.

According to the present invention, it is possible to identify each device on the second network using the first address for use in the first network even in the case where the second address for use in the second network which is different from the first network is changed. Thus, even in the case where the second address is changed as necessary, it is possible to identify each device on the second network and reliably transfer data to a desired device.

In the case where a device located at a midpoint on the transfer path in the second network obstructs transfer because it is turned off, for example, it is possible to identify the obstructing device using the first address for use in the first network. Therefore, it is possible to perform a process for removing the obstruction by, for example, activating the device in question through control using the first network, eliminating the necessity of keeping the devices ready for communication over the second network at all times.

BRIEF DESCRIPTION OF THE DRAWINGS

FIG. 1 depicts an exemplary configuration of a network according to an embodiment of the present invention;

FIG. 5 illustrates an exemplary address table according to the embodiment of the present invention;

DESCRIPTION OF THE PREFERRED EMBODIMENTS

An embodiment of the present invention will be described below with reference to the accompanying drawings.

The description of the embodiment will be made in the following order.

Figure 2A:
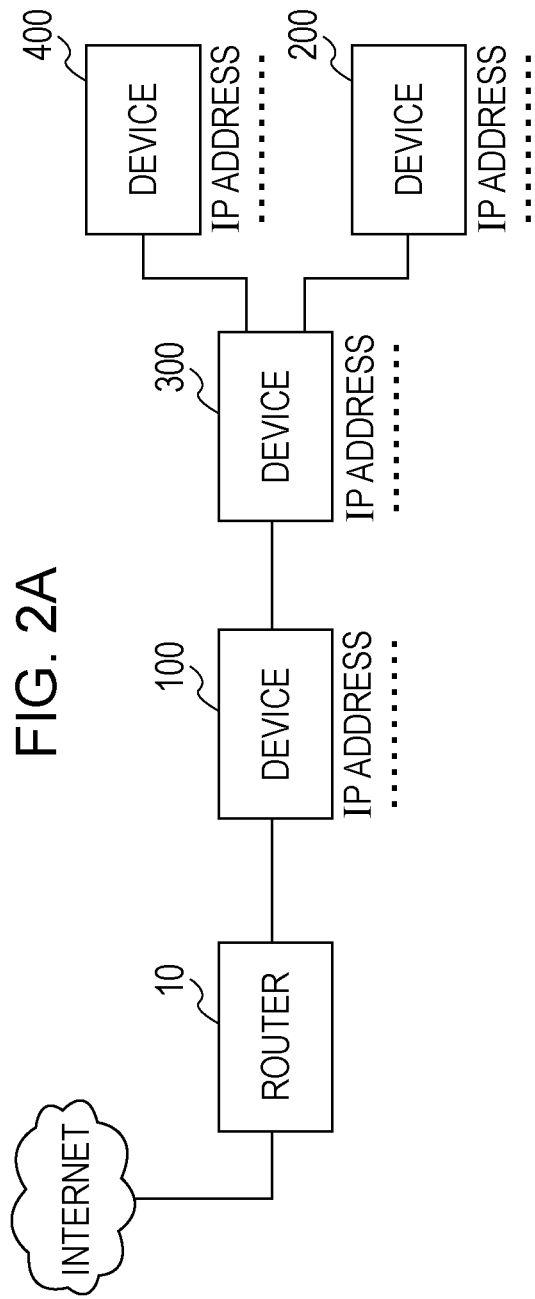
FIG. 2A illustrates an exemplary configuration of an IP network in the configuration of FIG. 1.
Figure 2B:
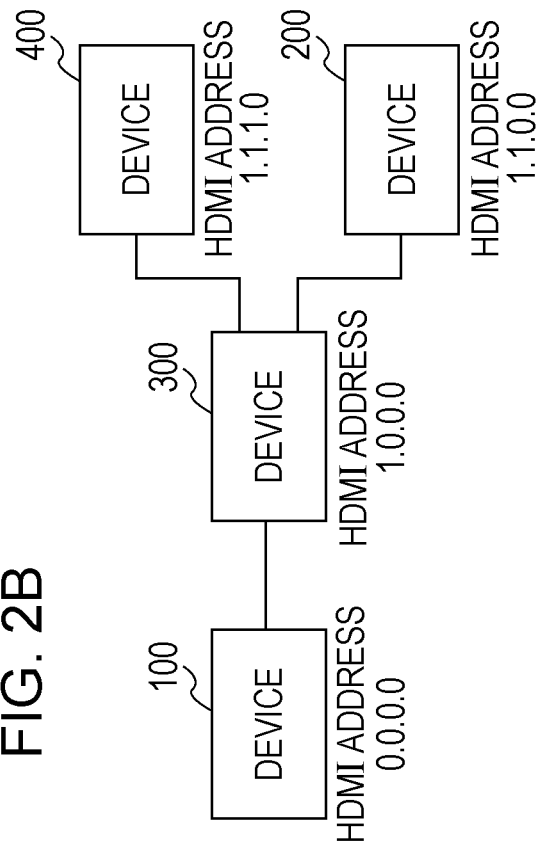
FIG. 2B illustrates an exemplary configuration of an HDMI network in the configuration of FIG. 1.

1. Exemplary configuration of entire system (FIGS. 1, 2A, and 2B)
2. Exemplary configuration of devices on network (FIG. 3)
3. Details of transfer over HDMI network (FIG. 4)
4. Example of address table (FIG. 5)
5. Example in which contents are played on another device on network (FIGS. 6 and 7)
6. Example in which device on network is updated via Internet (FIGS. 8 and 9)
7. Example of plurality of paths (FIG. 10)
8. Effect of embodiment
9. Modifications 1. Exemplary Configuration of Entire System: FIGS. 1, 2A, and 2B FIG. 1 shows the outline of the entire system according to the embodiment.

Four video devices 100, 200, 300, and 400 are provided. The first video device 100 is a television receiver, and the second video device 200 is a video recording/playback device. The third video device 300 and the fourth video device 400 are also each a video device or a sound device for recording/playing video or sound.

The four video devices 100 to 400 each include terminals according to the HDMI standard (hereinafter referred to as "HDMI terminal"), and are connectable to each other through an HDMI transfer cable 90. The HDMI terminals may be an output terminal for video data and sound data or an input terminal for video data and sound data. In either case, control data associated with control of data to be input or output, such as video data and sound data, may be both input to and output from the HDMI terminals.

In the example of FIG. 1, an HDMI terminal (input terminal) of the first device 100 as a television receiver is connected to an HDMI terminal (output terminal) of the third device 300 using an HDMI transfer cable 90. Another HDMI terminal (input terminal) of the third device 300 is connected to an HDMI terminal (output terminal) of the second device 200 using an HDMI transfer cable 90. Still another HDMI terminal (input terminal) of the third device 300 is connected to an HDMI terminal (output terminal) of the fourth device 400 using an HDMI transfer cable 90.

In the example, not only an HDMI network but also an IP network over which packets (IP packets) are transferred on the basis of an IP addresses is formed by the HDMI transfer cables 90. A specific example of the IP network formed using the HDMI transfer cables will be discussed later.

The first device 100 as a television receiver includes a network terminal for LAN connection. A router 10 is connected to the LAN terminal via a LAN cable 11. The router 10 is connected to the Internet via a LAN cable 12.

The configuration of the IP network and the configuration of the HDMI network in the configuration of FIG. 1 are individually shown in FIGS. 2A and 2B, respectively.

FIG. 2A shows the configuration of the IP network.

In the IP network, the devices 100 to 400 are connected sequentially to the router 10, allowing data transfer between the devices and the Internet by way of the router 10. Therefore, the router 10 assigns different IP addresses to the devices 100 to 400 in the IP network. In order to transfer data over the IP network, the IP address of the destination is affixed to each packet (IP packet). In the case where the IP address of the destination is an external address on the Internet, data to be transferred is transferred from the router 10 to an external device (server, client, etc.) by way of the Internet.

The router 10 may either assign static IP addresses to the devices or change the IP addresses assigned to the devices any time. Basically, it is highly possible that the IP addresses are changed when the network configuration is changed. Such changes in the network configuration include a case where a device in the IP network is completely turned off, for example.

FIG. 2B shows the configuration of the HDMI network.

In the HDMI network, video data and sound data and control data are transferred between the four devices directly connected through the HDMI transfer cables 90. A key device in the network, for example the first device 100, assigns addresses for use in the HDMI network (HDMI addresses) on each detection of a change in the connection state of the cables 90, for example. In the example of FIG. 2B, HDMI addresses are assigned by the first device 100 as a television receiver. For example, the first device 100 is assigned with an HDMI address of "0.0.0.0", the second device 200 is assigned with an HDMI address of "1.1.0.0", the third device 300 is assigned with an HDMI address of "1.0.0.0", and the fourth device 400 is assigned with an HDMI address of "1.1.1.0". The above HDMI addresses are exemplary. HDMI addresses may be assigned by a device in the network other than the first device 100. The once assigned HDMI addresses are maintained until the configuration of the devices connected via the HDMI transfer cables 90 is changed.

In the embodiment, data for an address table indicating the correspondence between the HDMI addresses and the IP addresses is generated in each of the video devices 100 to 400, which are connectable to both the HDMI network and the IP network, and stored in a memory in each device. The address table is updated upon each IP address change. A specific example of the address table will be discussed later.

Figure 3:
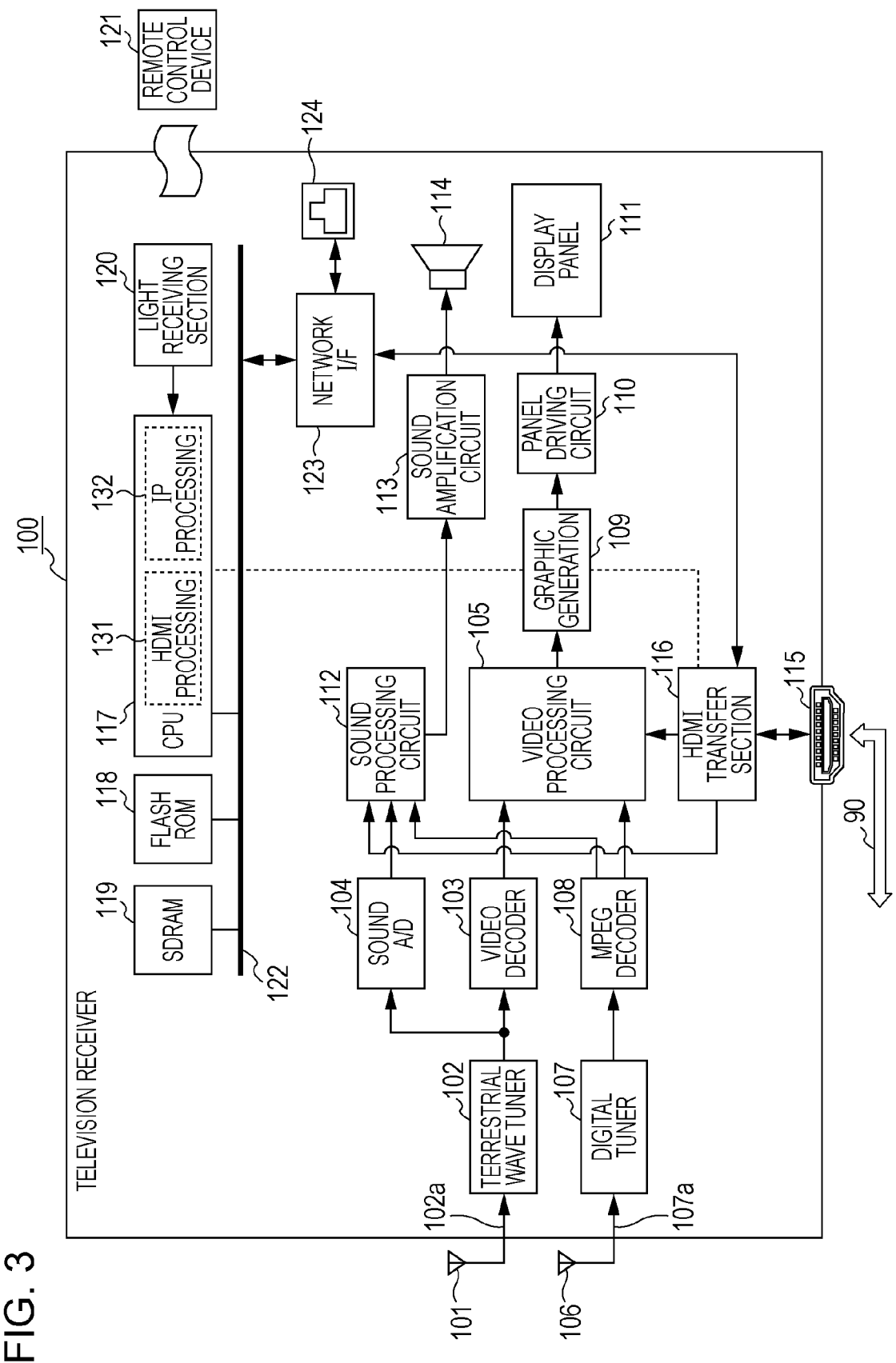
FIG. 3 is a block diagram showing an exemplary television receiver as a transfer device according to the embodiment of the present invention.

2. Exemplary Configuration of Devices on Network: FIG. 3

The configuration of the devices connected to the network is described. The configuration of the television receiver as the first device 100 is described as an example.

A television receiver 100 as the first device has an antenna input terminal 102a for analog broadcast reception to which a terrestrial wave antenna 101 is connectable, and an antenna input terminal 107a for digital broadcast reception to which a digital broadcast receiving antenna 106 is connectable.

A broadcast wave signal input from the antenna input terminal 102a for terrestrial analog broadcast reception is demodulated into baseband video and sound signals by a terrestrial wave analog tuner 102. The obtained video signal is converted into digital component data by a video decoder 103. The obtained sound signal is converted into a digital signal by a sound analog/digital converter 104.

A broadcast wave signal input from the antenna input terminal 107a for digital broadcast reception is converted into an MPEG-TS stream by a digital demodulation tuner 107. The MPEG-TS stream is supplied to an MPEG decoder 108. The MPEG decoder 108 decodes video data into digital component data and sound data into digital sound data.

The respective converted video data are supplied to a video processing circuit 105. After various video processing is performed, the video data is supplied to a graphic generation circuit 109. The graphic generation circuit 109 generates a graphic screen necessary to operate the television receiver 100, and superimposes the graphic screen on the video data being displayed or substitutes the video data with the graphic screen. The graphic generation circuit 109 also prepares a user interface screen such as a contents list. Video data output by the graphic generation circuit 109 is supplied to a panel driving circuit 110. The panel driving circuit 110 drives a display panel 111 on the basis of the supplied video data to cause the display panel 111 to display video.

Meanwhile, the converted sound data is supplied to a sound processing circuit 112. After various sound processing is performed, the sound data is supplied to a sound amplification circuit 113. After adjustment to an appropriate volume, sound is output from a speaker 114.

The various processes performed in the television receiver 100 are executed under control by a CPU 117 for controlling operation of the entire television receiver 100. Software (a program) necessary for the control by the CPU 117 is stored in a flash ROM 118, and executed using an SDRAM 119. The CPU 117 and the memories 118 and 119 are connected through an internal bus 122. Data input from the outside such as a contents list is also stored in the SDRAM 119 or the flash ROM 118 under control by the CPU 117. The stored data such as a contents list is read under control by the CPU 117, and used to cause the graphic generation circuit 109 to generate a user interface screen.

The television receiver 100 according to the example further includes a light receiving section 120 for receiving a remote control signal, and is configured to receive a remote control signal (an infrared signal) transmitted from a separate remote control device 121 to send a control command indicated in the remote control signal to the CPU 117.

The television receiver 100 according to the example includes an HDMI terminal 115 and a network terminal 124 as external input terminals. The HDMI terminal 115 receives baseband video data etc. The received digital baseband data is subjected to input processing performed by an HDMI transfer section 116. The received video data and sound data are supplied to and processed by the video processing circuit 105 and the sound processing circuit 112, respectively, and displayed as video and output as sound, respectively.

The network terminal 124 is connectable to an IP network such as Ethernet (registered trademark), and connected to a network interface section 123. The network interface section 123 performs a process for data transfer with another device connected via the network terminal 124 under control by the CPU 117.

In the embodiment, the HDMI transfer section 116 performs a transfer process for the HDMI network using the HDMI transfer cable 90 connected to the HDMI terminal 115. The HDMI transfer section 116 also performs a transfer process for the IP network using a part of the HDMI transfer cable 90 connected to the HDMI terminal 115. For this purpose, the HDMI transfer section 116 performs data transfer with the network interface section 123 to receive data sent from the network interface section 123 over the IP network and supply data received via the IP network to the network interface section 123.

These processes are executed on the basis of control by the CPU 117. The CPU 117 includes at least an HDMI network control processing function section 131 and an IP network control processing function section 132. Data transfer over each network is executed under control by the HDMI network control processing function section 131 and the IP network control processing function section 132. The HDMI network control processing function section 131 and the IP network control processing function section 132 may be implemented by hardware as dedicated control sections, or may be implemented by software as respective processing function sections. The HDMI network control processing function section 131 and the IP network control processing function section 132 causes an address table for storing addresses (HDMI addresses and IP addresses) for use in the respective networks (the HDMI network and the IP network) to be generated, and stored in a part of the storage area in the SDRAM 119 or the flash ROM 118. The address table is generated by the CPU 117 on the basis of the addresses used by the HDMI network control processing function section 131 and the IP network control processing function section 132. When a device on the network transfers data, data in the address table is referenced to identify the recipient or sender address or device. Commands sent over each network are generated by the HDMI network control processing function section 131 or the IP network control processing function section 132 in the CPU 117. A received command is determined by the HDMI network control processing function section 131 or the IP network control processing function section 132, which executes a process on the basis of the determined command.

In the example, power for a communication function section of the device 100, which is necessary for communication over the HDMI network, may be controlled to be on or off independently of whether the entire device 100 has been turned on or off. Likewise, power for a communication function section of the device 100, which is necessary for performing communication over the IP network, also may be controlled independently of whether the entire device 100 has been turned on or off.

The devices other than the first device 100, namely the devices 200 to 400, basically have the same configuration with regard to network connection, although not described herein. It should be noted, however, that the devices 200 to 400 may include the HDMI terminal 115 but not the network terminal 124.

Figure 4:
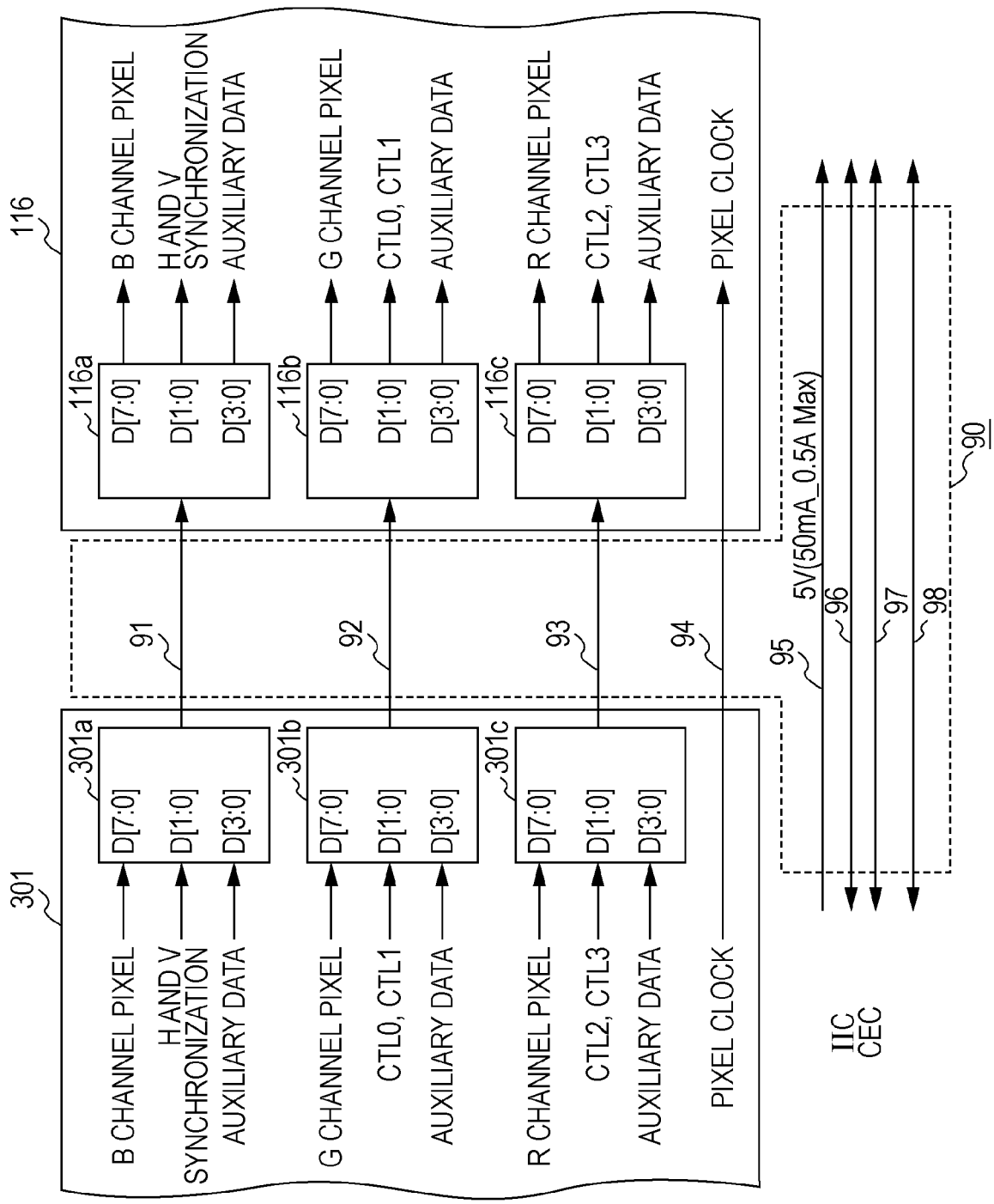
FIG. 4 depicts an example of transfer through an HDMI line according to the embodiment of the present invention.

3. Details of Transfer Over HDMI Network: FIG. 4

An exemplary configuration for data transfer through the HDMI transfer cable 90 is described with reference to FIG. 4. In the example of FIG. 4, the HDMI transfer cable 90 connecting between the first device 100 and the third device 300 is shown.

According to the HDMI standard, as shown in FIG. 4, three channels for transferring video data, namely Channel 0, Channel 1, and Channel 2, and a clock channel for transferring a pixel clock are provided. Data in the respective channels are transferred through individual lines 91, 92, 93, and 94.

For each channel, pixel data, vertical synchronization data and horizontal synchronization data, and auxiliary data are synthesized and transmitted by channel synthesis sections 301*a*, 301*b*, and 301*c* in an HDMI transfer section 301 of the device 300 as the sender. Channel separation sections 116*a*, 116*b*, and 116*c* in the HDMI transfer section 116 of the device 100 as the recipient separate the pixel data, the vertical synchronization data and horizontal synchronization data, and the auxiliary data.

Channel 0 is used to transfer pixel data for the B data (data for blue color), the vertical synchronization data, the horizontal synchronization data, and the auxiliary data. Channel 1 is used to transfer pixel data for the G data (data for green color), two types of control data (CTL0 and CTL1), and the auxiliary data. Channel 2 is used to transfer pixel data for the R data (data for red color), two types of control data (CTL2 and CTL3), and the auxiliary data.

A transfer line 95 for power supply and a Display Data Channel (DDC) line 96 and a Consumer Electronics Control (CEC) line 97 as control data transfer channels are also provided. The DDC line 96 is a data channel mainly for display control. The CEC line 97 is a data channel mainly for controlling a recipient device connected through a cable.

In the example, further, a specific line in the HDMI transfer cable 90 which may be unused or may be used commonly is used as an IP packet transfer line 98. In the case where IP packets are transferred bidirectionally over a LAN network, in general, separate lines are used for transfer from a first device to a second device and transfer from the second device to the first device. In the example, however, signals for both directions are superimposed on each other, allowing common use of the single line 98.

4. Example of Address Table: FIG. 5

An exemplary address table to be stored in a memory of each device (such as the SDRAM 119 of the device 100) is described.

As shown in FIG. 5, the address table stores the correspondence between the HDMI addresses and the IP addresses for at least all the devices on the HDMI network. The address table also stores information on the type of each device on the network determined through exchange of control commands over the IP network or exchange of control commands over the HDMI network. Specifically, in case the of the network configuration of FIG. 1, the address table stores information indicating the type of the device 100 as being a display device, the device 200 as being a recording/playback device, the device 300 as being an audio processing device, and the device 400 as being a playback device. The type of each device to be stored may be determined more specifically. The address table further stores distinction as to whether each device acts as a server or a client according to a DLNA standard to be discussed later or does not support the DLNA standard. Data on the distinction as to whether each device acts as a server or a client or does not support the DLNA standard has been collected on the basis of commands transferred through the CEC line 97 (FIG. 4) over the HDMI network.

The address table still further stores whether or not each device has an Internet connection function. A device with the Internet connection function may include a terminal directly connectable to a router or a similar device, such as the network terminal 124 of the first device 100 shown in FIG. 3, for example. The Internet connection function may be implemented by wireless Internet connection.

The address table shown in FIG. 5 is provided in all the devices connectable to both the IP network and the HDMI network, in other words, all the devices connected to both the HDMI network and the IP network through the HDMI transfer cable 90.

Figure 6:
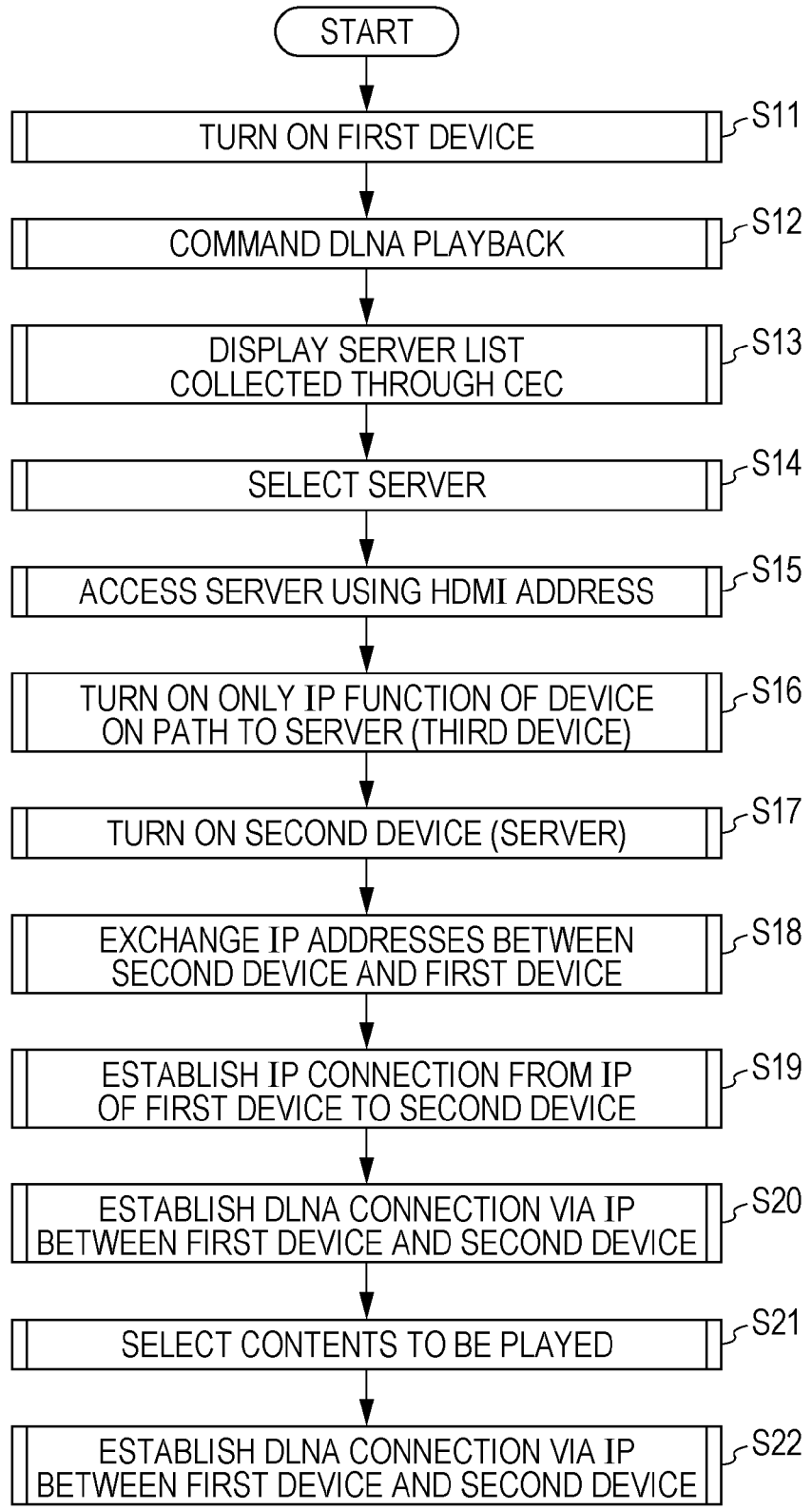
FIG. 6 is a flowchart showing an exemplary process for playing contents in a second device from a state with devices turned off according to the embodiment of the present invention.
Figure 7:
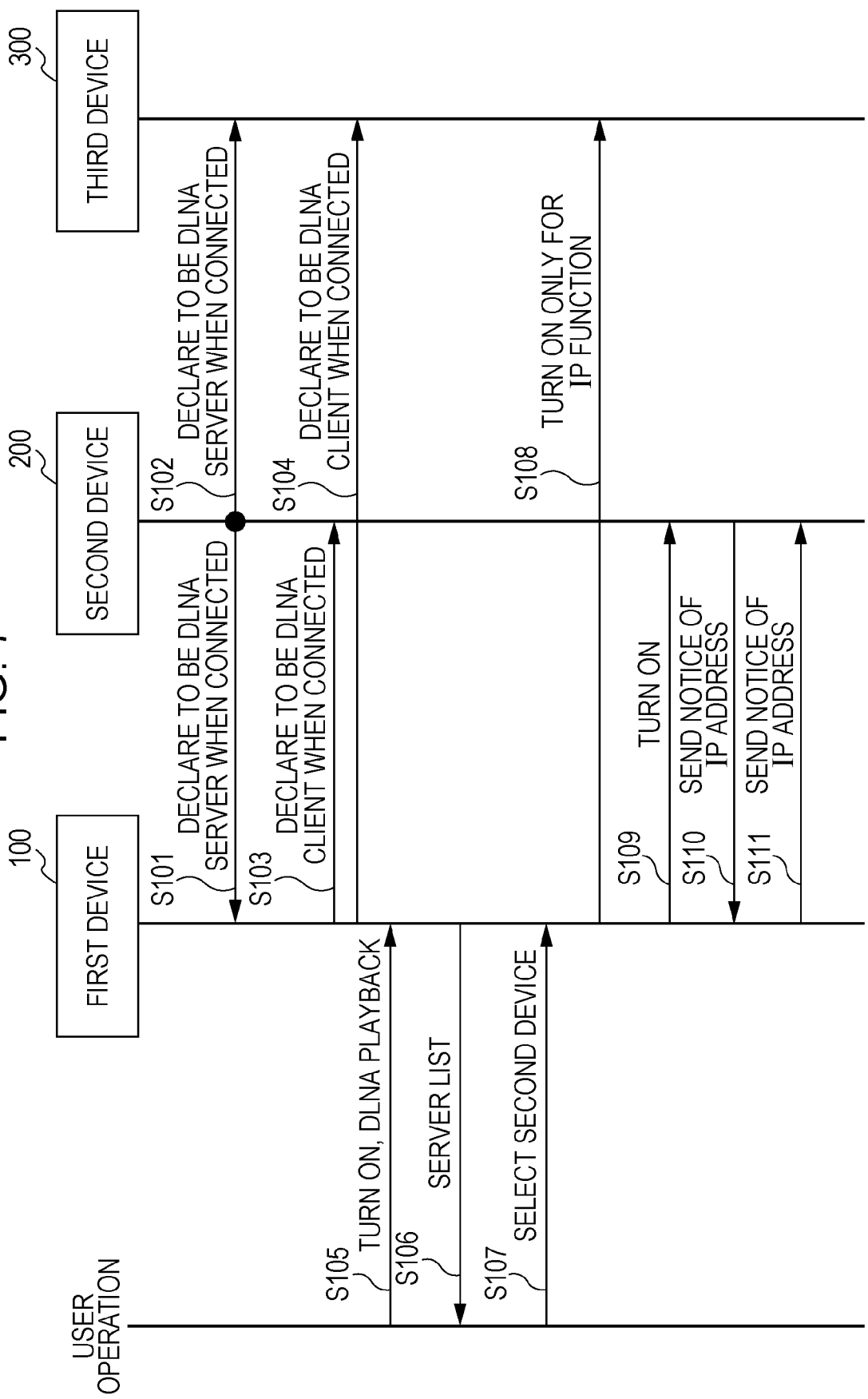
FIG. 7 is a sequence diagram showing an example of data transfer through a CEC line in the exemplary process of FIG. 6.

5. Example in Which Contents are Played on Another Device on Network: FIGS. 6 and 7

An example of data transfer using the respective networks is described. In the IP network, video contents and sound contents may be transmitted and received according to Digital Living Network Alliance guidelines (hereinafter referred to as "DLNA standard") as a contents transfer standard (guidelines).

The flowchart of FIG. 6 illustrates an example in which in the network configuration shown in FIG. 1, necessary devices are turned on from a state with all the devices on the network turned off, and video contents are played on the second device 200 shown in FIG. 1 and transferred to the first device 100. The video contents received by the first device 100 and sound data accompanying the video contents are subjected to a video display process and a sound output process, respectively, performed by the device 100 as a television receiver. Data for video contents is transferred from the second device 200 to the first device 100 as IP packets over the IP network according to the DLNA standard.

The process of the flowchart of FIG. 6 is described sequentially. Initially, all the devices on the HDMI network have been turned off and in the standby state. When each device has been turned off, it is capable of communication using the communication function section for the HDMI network, but incapable of communication using the communication function section for the IP network. In order to perform communication over the IP network, it is necessary to turn on at least the communication function section for the IP network.

With all the devices turned off, a user operates a power key of the remote control device 121 (FIG. 3) to turn the first device 100 from an off state into an on state (step S11). The user also performs an operation to command playback of contents accumulated in another device (server) in accordance with the DLNA standard (step S12). Then, a list of devices operable as a server in accordance with the DLNA standard is prepared on the basis of data in the address table and displayed (step S13), allowing the user to perform an operation to select a device from the list (step S14). It is assumed that the user selects the second device 200. In a transfer process according to the DLNA standard, which uses the IP network, the devices on the list are identified using IP addresses. Here, an IP address corresponding to the HDMI address of the selected device is identified using the address table shown in FIG. 5.

The first device 100 accesses the second device 200 as the selected device using the HDMI address over the HDMI network (step S15). A command is provided over the HDMI network to turn on the IP network function of any device interposed between the first device 100 and the second device 200, namely the third device 300 (step S16).

The second device 200 as the selected server is turned on (step S17), and the first device 100 and the second device 200 exchange their IP addresses through communication over the HDMI network to verify their current IP addresses (step S18). If the verified IP address of a device is different from the IP address of the device stored in the address table, the stored data is updated.

When the above processes are performed, connection is established from the first device 100 to the second device 200 using the IP addresses obtained in step S18 using Internet Protocol over the IP network (step S19), and connection is established between the first device 100 and the second device 200 through procedures according to the DLNA standard (step S20). Thereafter, the contents list held by the second device 200 is displayed on the first device 100 in accordance with procedures prescribed by the DLNA standard, allowing selection of contents to be played from the list (step S21). The selected contents are sent from the second device 200 to the first device 100 so that the first device 100 displays video and outputs sound (step S22).

FIG. 7 shows an exemplary process performed in the CEC line of the HDMI network in the process of the flowchart of FIG. 6. As described already, control data for the HDMI network is exchanged through the CEC line. As preprocesses to be performed before the process of the flowchart of FIG. 6, the first device 100, the second device 200, and the third device 300 have declared in advance whether they are a server or a client according to the DLNA standard during communication over the HDMI network.

That is, the second device 200 declares to be a server according to the DLNA standard to the first device 100 (step S101), and also declares to be a server according to the DLNA standard to the third device 300 (step S102).

The first device 200 declares to be a client according to the DLNA standard to the second device 200 (step S103), and also declares to be a client according to the DLNA standard to the third device 300 (step S104). The declaration of being a server or a client is performed using the CEC line, and may be performed any time. The declared type is stored in the address table.

When the above preprocesses are performed, the user performs an operation, with all the devices turned off, to turn on the first device 100 and play in accordance with DLNA (step S105). This command is performed using the remote control device 121 (FIG. 3), for example. A list of servers is displayed on the basis of the operation (step S106), and the user selects the second device 200, for example, on the basis of the displayed list (step S107).

When the selection is performed, the first device 100 sends to the third device 300 a power-on command for turning on its IP network communication function using the CEC line (step S108) to turn on only the IP network communication function section of the third device 300. The first device 100 also sends a power-on command to the second device 200 using the CEC line (step 5109) to activate various functions of the second device 200.

Thereafter, the second device 200 informs the first device 100 of the IP address of the second device 200 using the CEC line (step S110), and the first device 100 informs the second device 200 of the IP address of the first device 100 using the CEC line (step S111). The above processes are performed for the HDMI network, after which processes for the IP network are performed as illustrated in the flowchart of FIG. 6.

In the sequence diagram of FIG. 7, a power-on command is transferred using the CEC line as a control command. Additionally, a power-off command for turning off a device receiving the command after the processes are finished. In case the of a power-off command, a command for bringing the entire device to the standby state and a command for turning off the communication function section for the IP network may be provided. Alternatively, a single type of command may be used commonly.

Figure 8:
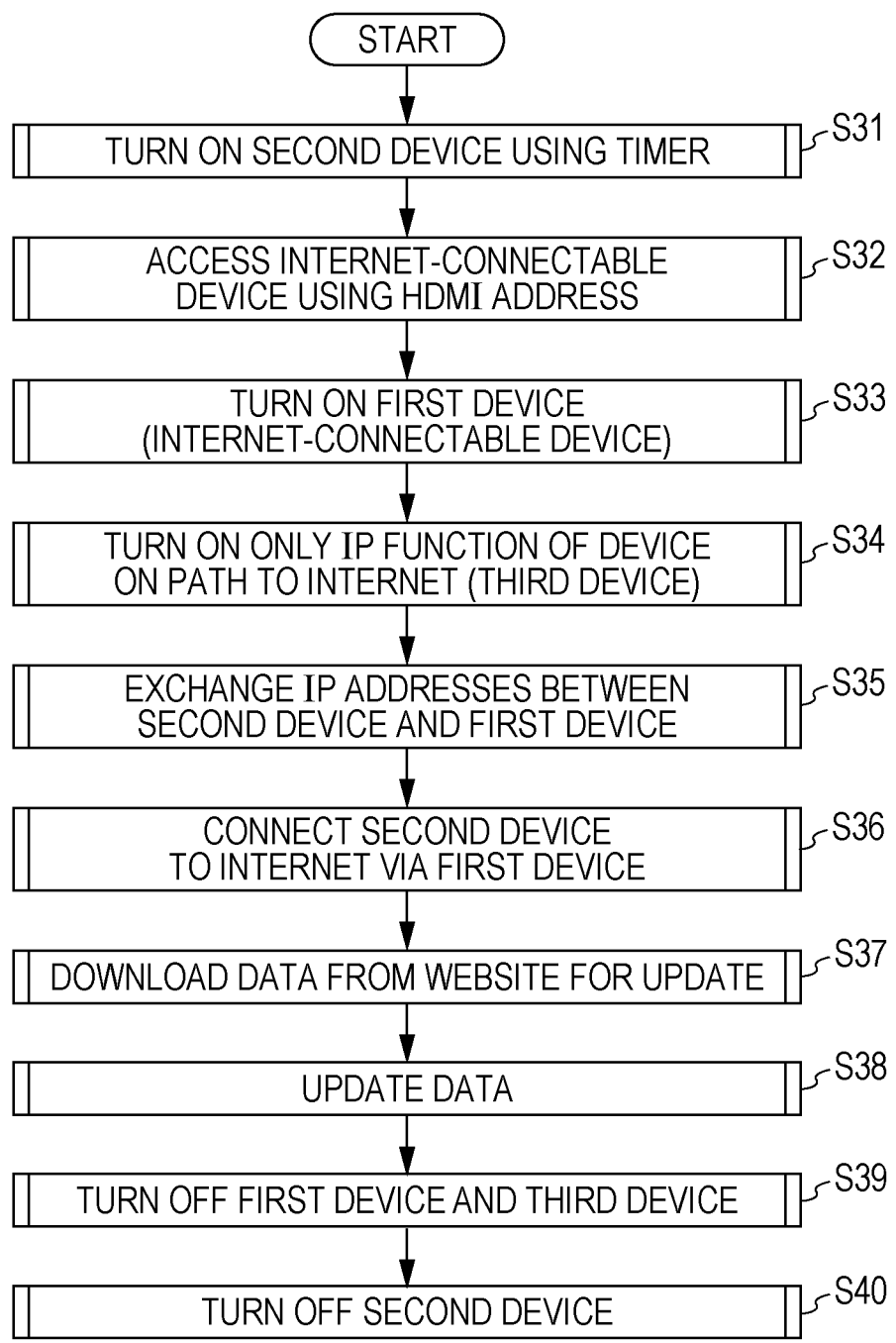
FIG. 8 is a flowchart showing an exemplary process for updating data in a device on the network according to the embodiment of the present invention.
Figure 9:
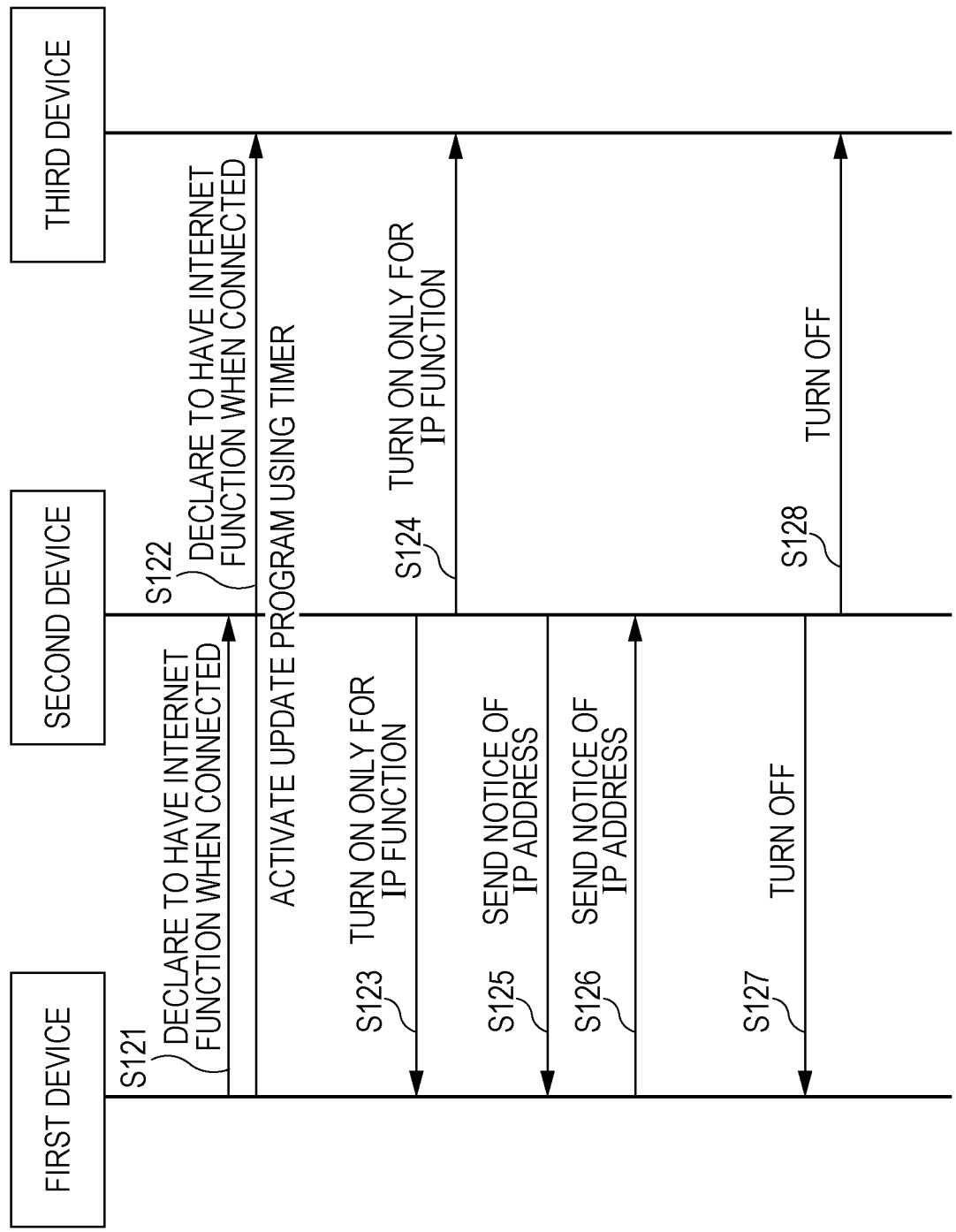
FIG. 9 is a sequence diagram showing an example of data transfer through a CEC line in the exemplary process of FIG. 8.

6. Example in Which Device on Network is Updated Via Internet: FIGS. 8 and 9

An exemplary process in which the second device 200 updates software installed in the second device 200 using the IP network is described with reference to FIGS. 8 and 9. In this case, the second device 200 which is connected to the IP network accesses a server storing software for an update via the Internet (outside) as an external network. Also in this case, all the devices connected to the network have been turned off initially.

With reference to FIG. 8, first, the second device 200 is turned on using a timer function installed in the device 200 itself (step S31). The second device 200 accesses a device for connection to the Internet using the HDMI address over the HDMI network (step S32). The "device for connection to the Internet" designates the first device 100 which is directly connected to the router 10 of FIG. 1 as is seen from the address table of FIG. 5.

The second device 200 then sends a command for turning on the IP network communication function section of the first device 100 to the first device 100 using the CEC line of the HDMI network to turn on the Internet connection function section of the first device 100 (step S33). The second device 200 further sends a command for turning on the IP network communication function section of the third device 300, which is located at a midpoint on the path between the second device 200 and the first device 100, to the third device 300 in order to turn on the communication function section of the third device 300 (step S34).

Thereafter, the second device 200 and the first device 100 exchange their IP addresses with each other using the CEC line of the HDMI network for verification (step S35). The first device 100 allows the second device 200 to connect to the Internet over the IP network by way of the first device 100, and access an external website (step S36). The second device 200 downloads data for software for an update via the first device 100 (step S37), and updates the software in the device 200 using the downloaded data (step S38).

When the above processes are completed, the second device 200 sends a power-off command to the first device 100 and the third device 300 using the CEC line of the HDMI network to bring the devices to the standby state (step S39). Finally, the second device 200 itself is turned off into the standby state (step S40).

FIG. 9 shows an exemplary process performed in the CEC line of the HDMI network in the process of the flowchart of FIG. 8.

As preprocesses to be performed before the process of the flowchart of FIG. 8, the first device 100 declares in advance that it has an Internet connection function to each device through the CEC line during communication over the HDMI network (steps S121 and S122).

Each device receiving the declaration as to the Internet connection function stores the received information in its address table. That is, information as to whether the first device 100 has an Internet connection function ("Yes") or not ("No") is stored as shown in the address table of FIG. 5.

When a time for an update comes, the second device 200 for which an update is desired sends a power-on command to the first device 100 and the third device 300 using the CEC line of the HDMI network (steps S123 and S124). The power-on command is a command for turning on the IP network communication function section of the first device 100 and the third device 300. Thereafter, the first device 100 and the second device 200 exchange their IP addresses using the CEC line (steps S125 and S126), and perform communication for Internet connection over the IP network using the verified IP addresses.

When the update process is finished, the second device 200 sends a power-off command to the first device 100 and the third device 300 using the CEC line to turn off the devices (steps S127 and S128).

Figure 10:
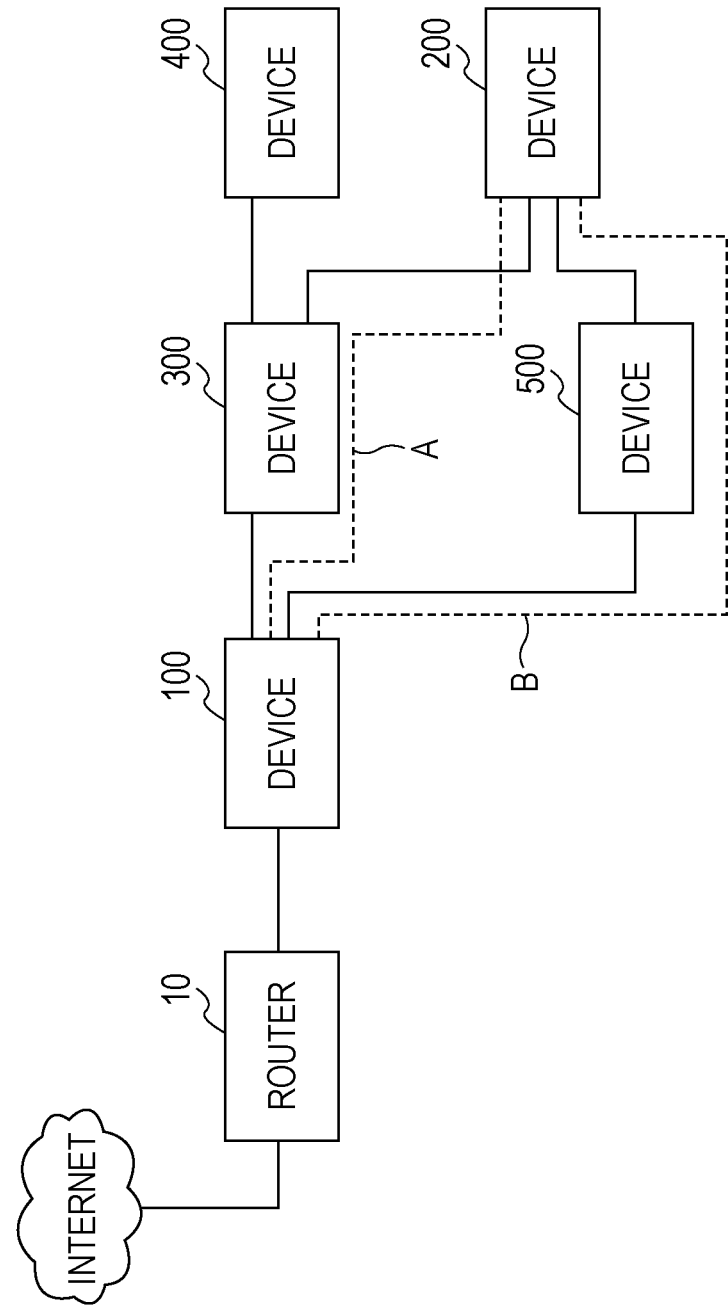
FIG. 10 depicts another exemplary configuration of a network according to the embodiment of the present invention.

7. Example of Plurality of Paths: FIG. 10

In the network configuration of FIG. 1, the path for data transfer is determined uniquely. In the case where a plurality of paths are provided, however, the state of the devices may be checked using the CEC line of the HDMI network before selecting a path for data transfer over the IP network.

That is, it is assumed that connection through a path A via a third device 300 and connection through a path B via a fifth device 500 are provided as connection between a first device 100 and a second device 200 through an HDMI transfer cable as shown, for example, in FIG. 10. Each HDMI transfer cable also serves for the IP network connection function.

With this configuration, there may be a case where when the second device 200 desires communication with the first device 100 over the IP network, the third device 300 located at a midpoint on the path A is in operation and thus may obstruct relay of data. In this case, the second device 200 selects the path B, and sends a power-on command to the fifth device 500 using the CEC line of the HDMI network to turn on the IP network communication function section of the fifth device 500 to start communication through the path B.

In this way, even in the case where a plurality of paths are provided in the IP network, selection of a path may be performed on the basis of determination results for the HDMI network.

8. Effect of Embodiment

According to the embodiment described above, in the case where two network connections, namely HDMI network and IP network, are provided, selection of a device for transfer over the IP network is performed easily and reliably. Thus, even in the case where addresses for the IP network are changed as necessary, it is possible to identify devices on the network and reliably transfer data to a desired device.

In the case where a device located at a midpoint on the transfer path in the IP network obstructs transfer because it is turned off, for example, it is possible to identify the obstructing device using addresses for the HDMI network. Therefore, it is possible to perform a process for removing the obstruction by activating the device in question, for example, through control using the HDMI network, eliminating the necessity of keeping the devices ready for communication through the IP network at all times and contributing to reduction of power consumption of the devices.

9. Modifications

In the embodiment discussed above, two networks are connected through a single transfer line by performing transfer through the IP network using a specific line in the transfer line for the HDMI network. Alternatively, the same process may be performed for networks connected through separate transfer lines. At least one of the two networks may be a network formed by wireless connection.

In the embodiment, one of the two networks (first network) is an HDMI network and the other (second network) is an IP network. However, the two networks may each be a network with a different system configuration.

In the embodiment discussed above, a video device or a sound device such as a television receiver functions as a transfer device connectable to two networks. However, the present invention may also be applied to a personal computer device (an information processing device) for performing various data processing, for example. In this case, the personal computer device includes the network connection terminals and the network communication processing function sections of the embodiment. The personal computer device further stores data equivalent to an address table, and software (a program) for causing the two network communication function sections to execute the process in cooperation with each other.

The present application contains subject matter related to that disclosed in Japanese Priority Patent Application JP 2008-255452 filed in the Japan Patent Office on Sep. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transfer device comprising:
a first network connection control section that controls connection between the transfer device and a second device via a first network enabling transfer of content data and control data using a first address for the second device assigned by a key device in the first network;
a second network connection control section that controls connection between the transfer device and the second device via a second network enabling transfer of content data and control data using a second address for the second device assigned by a device having a routing function; and
at least one processor programmed to;
determine, using the second network connection control section, whether the second device is reachable via the second network at the second address, and
if it is determined that the second device is not reachable via the second network at the second address, transfer, using the first network connection control section, a first command via the first network to the second device at the first address,
wherein the first command is for activating a communication function section of the second device for communicating via the second network,
wherein the at least one processor is further programmed to transfer, using the first network connection control section, a second command via the first network to the second device, the second command being for deactivating the communication function section of the second device for communicating via the second network.

2. The transfer device according to claim 1,
wherein the first network connection control section controls connection using a first transfer line having at least a first signal line for transferring content data including video data and sound data, a second signal line for transferring control data, and a third signal line for use for other processes; and
the second network connection control section controls connection using the third signal line of the first transfer line.

3. The transfer device according to any one of claims 1 to 2,
wherein the first network is connected through a second transfer line according to a High-Definition Multimedia Interface standard; and
the second network is a network using an Internet Protocol address as the second address and enabling data transfer with the outside via the second network.

4. The transfer device according to claim 1, wherein:
the first network connection control section controls connection to a plurality of devices, comprising the second device, via the first network;
the second network connection control section controls connection to the plurality of devices via the second network; and
the address table stores correspondence between a first address and a second address for each of the plurality of devices.

5. The transfer device according to claim 1, further comprising an address table that stores correspondence between the first address for the first network used by the first network connection control section and the second address for the second network used by the second network connection control section, and wherein the at least one processor is programmed to retrieve the first address from the address table for use in transferring the first command to the second device.

6. A transfer method comprising the acts of:
controlling connection from a first device to a second device via a first network enabling transfer of content data and control data using a first address for the second device assigned by a key device in the first network;
controlling connection from the first device to the second device via a second network enabling transfer of content data and control data using a second address for the second device assigned by a device having a routing function;
determining whether the second device is reachable by the first device via the second network at the second address;
if it is determined that the second device is not reachable by the first device via the second network at the second address, transferring, by the first device, a first command via the first network to the second device at the first address, the first command being for activating a communication function section of the second device for communicating via the second network;
communicating data to the second device via the second network; and
transferring a second command via the first network to the second device, the second command being for deactivating the communication function section of the second device for communicating via the second network.

7. The transfer method according to claim 6, further comprising an act of storing in an address table correspondence between the first address and the second address, and wherein the act of transferring comprises retrieving the first address from the address table for use in transferring the first command to the second device.

8. At least one computer-readable storage device having encoded thereon a program for causing a transfer device as an information processing device to execute the acts of:
controlling connection from the transfer device to a second device via a first network enabling transfer of content data and control data using a first address for the second device assigned by a key device in the first network;
controlling connection from the transfer device to the second device via a second network enabling transfer of content data and control data using a second address for the second device assigned by a device having a routing function;
determining whether the second device is reachable by the transfer device via the second network at the second address;
if it is determined that the second device is not reachable via the second network at the second address, transferring a first command via the first network to the second device at the first address, the first command being for activating a communication function section of the second device for communicating via the second network;
communicating data to the second device via the second network; and
transferring a second command via the first network to the second device, the second command being for deactivating the communication function section of the second device for communicating via the second network.

9. The at least one computer-readable storage device according to claim 8, wherein the program is further for causing the transfer device to execute an act of storing in an address table correspondence between the first address and the second address, and wherein the act of transferring comprises retrieving the first address from the address table for use in transferring the first command to the second device.

* * * * *